United States Patent [19]

Akahoshi et al.

[11] Patent Number: 4,789,985

[45] Date of Patent: Dec. 6, 1988

[54] DOCUMENT PROCESSING APPARATUS HAVING FAUET DETECTION CAPABILITIES

[75] Inventors: Kimiharu Akahoshi, Sakai; Mikio Masui, Suita, both of Japan

[73] Assignee: Minolta Camera Kabushiki Kaisha, Osaka, Japan

[21] Appl. No.: 850,931

[22] Filed: Apr. 11, 1986

[30] Foreign Application Priority Data

Apr. 16, 1985 [JP] Japan ................................ 60-81915

[51] Int. Cl.⁴ .......................................... G06F 11/16
[52] U.S. Cl. ...................................... 371/11; 364/200
[58] Field of Search ................ 371/9, 11; 364/200, 364/900

[56] References Cited

U.S. PATENT DOCUMENTS

| | | | |
|---|---|---|---|
| 3,768,074 | 10/1973 | Sharp et al. | 364/200 |
| 3,905,023 | 9/1975 | Perpiglia | 364/200 |
| 4,371,754 | 2/1983 | De et al. | 371/9 X |
| 4,438,494 | 3/1984 | Budde et al. | 364/200 |
| 4,453,215 | 6/1984 | Reid | 364/200 |
| 4,503,535 | 3/1985 | Budde et al. | 371/11 |
| 4,542,506 | 9/1985 | Oe et al. | 371/9 |

Primary Examiner—Charles E. Atkinson
Attorney, Agent, or Firm—Price, Gess & Ubell

[57] ABSTRACT

A document processing apparatus that utilizes a plurality of resources, such as CRT displays and printers, are provided. A control system can determine if a resource has a fault and can select an alternative resource if it is capable of providing a functional output to the user. The control system can further determine if a resource is faulty but will not interfere with the data processing and can accordingly continue the operation of the document processing apparatus.

5 Claims, 5 Drawing Sheets

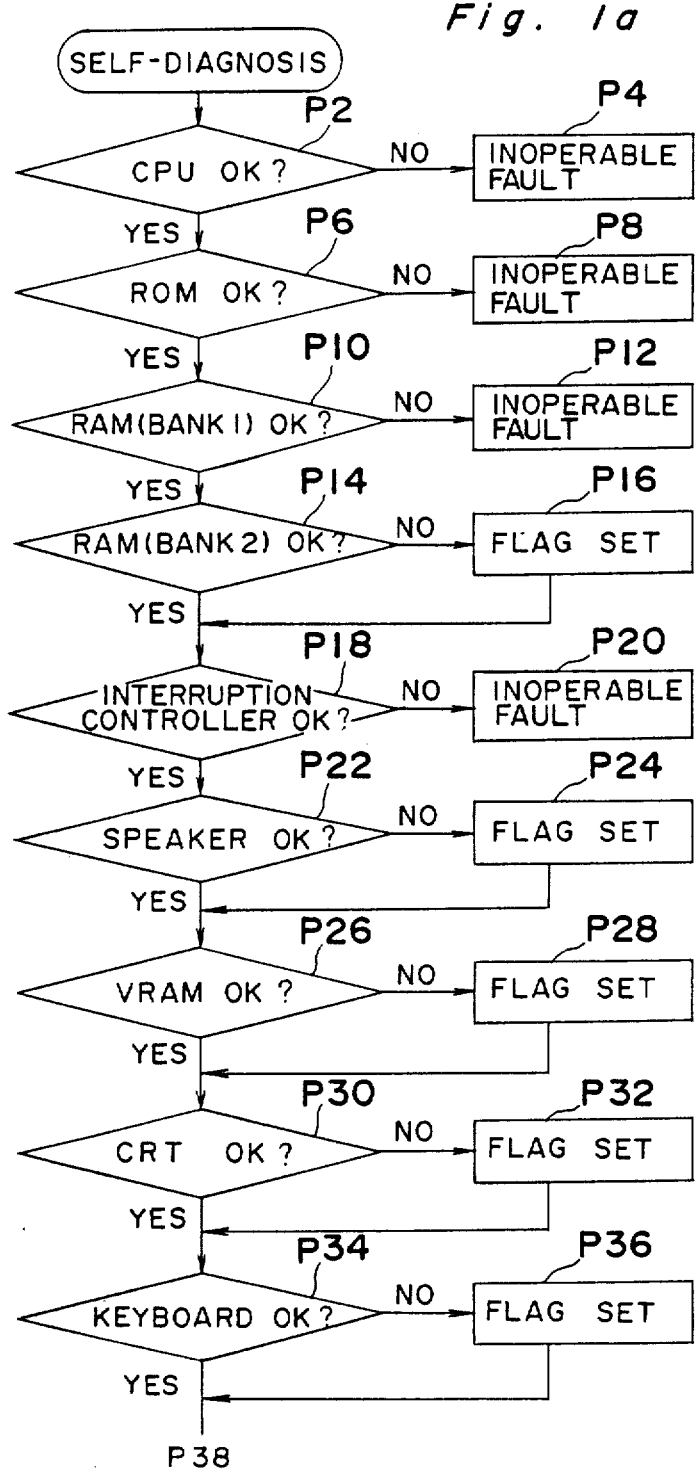
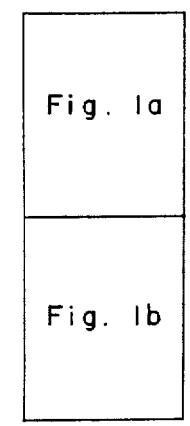
Fig. 1a
Fig. 1

DOCUMENT PROCESSING APPARATUS HAVING FAUET DETECTION CAPABILITIES

BACKGROUND OF THE INVENTION

1. Field of the Invention

The invention relates to a document, or word, processing apparatus (hereinafter called a word processor) for use in creating and editing a document.

2. Description of the Prior Art

A word processor to be used for creating and editing a document is provided with input/output units such as a keyboard, floppy disk drives, a printer and the like, operated by a host computer. Characters of a document, inputted through a keyboard, are stored in a memory, and thereafter, editing and correcting the inputted signals is carried out, and finally the characters are printed by a printer.

When a word processor program is initiated upon turn on of the main switch, a self-diagnosis of various resources (hardware and software necessary for driving a word processor) is carried out. If a resource is detected as abnormal, a system operation stops, and thereafter, the resource that has a fault is indicated. The user repairs or fixes the failed resource and restarts the system operation.

It is to be noted that some resources are not necessary for a particular task mode, such as a word processor mode, or they may be necessary but can be replaced with some other resources. Thus, even when such resources are found to be faulty resources through a self-diagnostic test, it is advantageous to continue an operation of the word processor mode, instead of stopping the operation. Also, if any substitute resources are available which can replace the failed resources, the operation should preferably be continued with an appropriate limitation applied to the system.

SUMMARY OF THE INVENTION

The present invention has been developed with a view to substantially solving the above described problem and has for its essential object to provide an improved document processing apparatus which can be operated by limiting the system operation to available task modes, even when a self-diagnostic test detects a fault.

A document processing apparatus, according to the present invention has a document processing means which comprises: a plurality of data input means; a plurality of data output means; a document processing means for storing, as necessary, the data inputted from the data input means; and memory storage means housed therein to process corrections and editing of the data and, thereafter, outputting the processed data to the data output means. The apparatus further comprises a self-diagnostic judgement means for judging whether or not resources of the data input/output means are available; a judgement means for judging whether or not a system operation should be stopped depending on the availability of replaceable resources, when the self-diagnostic means diagnoses any resources as unavailable; and an abnormality processing means for deciding available task modes to continue system operation in the available task modes when the judgement means has judged that system operation should not be stopped, despite the presence of unavailable resources.

According to the means described above, a system can be operated in available task modes, using replaceable resources if any resources are detected as abnormal.

BRIEF DESCRIPTION OF THE DRAWINGS

These and other objects and features of the present invention will become apparent from the following description taken in conjunction with a prepared embodiment thereof with reference to the accompanying drawings, throughout which like parts are designated by like reference numerals, and in which:

FIGS. 1-1a and 1b taken together as depicted in FIG. 1 show a flow chart of a self-diagnostic program;

DESCRIPTION OF THE PREFERRED EMBODIMENT

Figure 2:
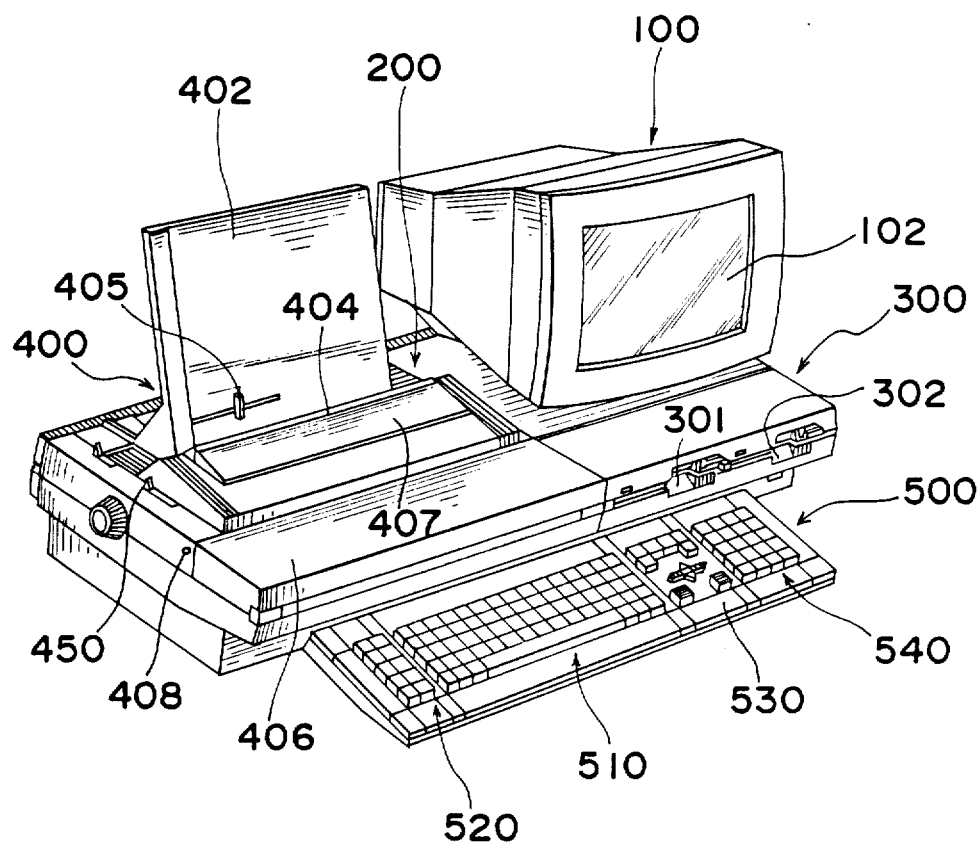
FIG. 2 is a perspective view of a document processing apparatus.

The embodiment of the invention will be described in the order of the following subtitles.

a. The structure of a word processor
b. The structure of a host computer
c. The use modes and the resources
d. The resource control
e. The self-diagnostic program
f. The decision program a. The structure of a word processor Referring to FIG. 2, a word processor of a preferred embodiment according to the present invention is shown.

The word processor comprises: a keyboard 500, a host computer 200 defined by a CPU, ROM, RAM, other electronic parts, and a power source receiving unit (FIG. 3); a main body 300 composed of floppy disk drives 301 and 302 functioning as external memories; a display 100; and a daisy wheel printer 400 functioning as an external output unit.

The description of each unit will be made hereinafter.

Main body 300 is provided with a main switch (not shown) and floppy disk drives 301 and 302 functioning as external memories. These three units are operable by a user.

Display 100 is provided with a brightness adjustment knob (not shown), and a CRT screen 102 which indicates inputs from keyboard 500. These two units are also operable by a user.

The keys disposed on keyboard 500 acting as an external input unit include: character keys 510, which serve as a means for inputting alphanumeric characters, which are disposed in a manner similar to a typewriter; function keys 520 to which specific commands are assigned for selecting different functions while the program of the word processor is loaded; operation keys 530 for performing various operations; and ten-keys 540 for inputting numbers.

The procedure for creating a document by the word processor will be described hereinafter.

With the power supply being cut off, a system disk, in which a word processor program is stored, is inserted into floppy disk drive 301, and a data disk for storing contents of a created document is inserted into floppy disk drive 302, and thereafter, the main switch provided on main body 300 is turned on. Host computer 200, housed in main body 300, starts reading the contents of the system disk inserted into floppy disk drive 301. When the contents of the word processor program stored in the system disk are loaded, a space where printer 400 can print is shown by a frame indicated on CRT screen 102 of display 100, and a cursor at the left margin of the first line indicates where printing is started. In this condition, upon pressing a character key on keyboard 500, an inputted character will be displayed at the cursor position.

b. The structure of the host computer

Figure 3:
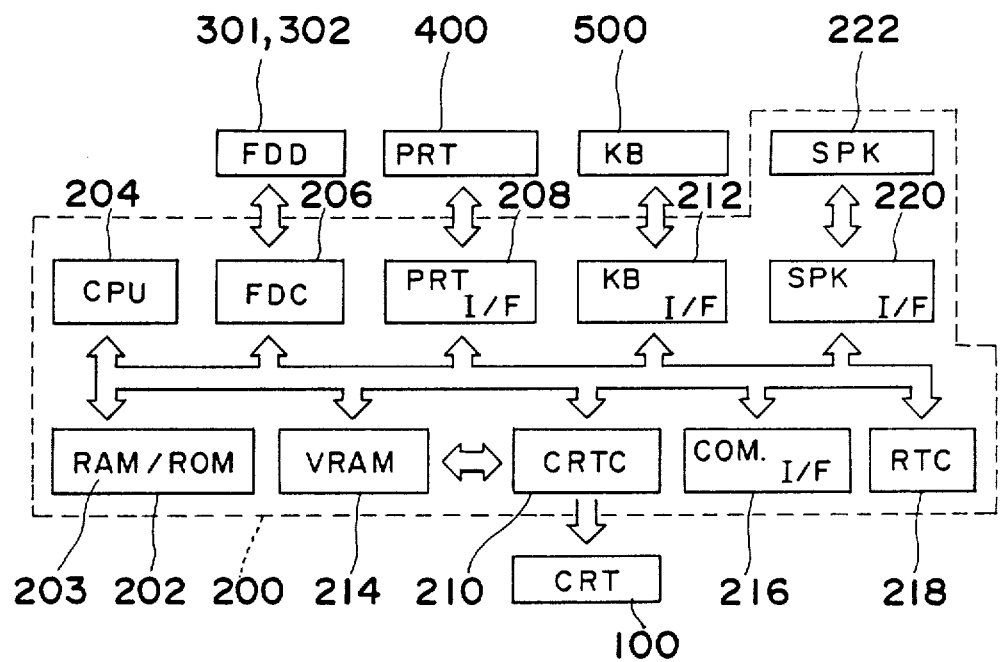
FIG. 3 is a block diagram of the document processing apparatus.

Referring to FIG. 3, a structure of host computer 200, having an input and output structure between ROM/RAM memory 202 and CPU 204, is shown schematically.

CPU 204, which is a microprocessor defined by the register and connected to an input/output interface which is known in the art and, therefore, a description thereof is omitted for the sake of brevity. FDC 206 is a floppy disk controller for controlling inputs to, and outputs from, floppy disk drives (FDD) 301 and 302. PRT I/F 208 serves as the interface for a signal input/output with printer (PRT) 400. CRT controller (CRTC) 210, connected to video memory (VRAM) 214, serves as the interface for signal output with display (CRT) 100. Keyboard interface (KBI/F) 212 serves as the input/output interface with keyboard (KB) 500. COM I/F 216 is the communication port serving as an input/output interface with the external appliances. RTC 218 is a clock showing the present date and time (real time). SPK I/F 220 serves as the input/output interface with speaker (SPK) 222. Speaker 222 is used for generating an alarm sound (fault sound).

When the main switch of the main body 300 is turned on, with the system disk inserted into floppy disk drive 301, and the data disk into floppy disk drive 302, CPU 204 permits RAM 203, in memory 202, to store the contents of the system disk in accordance with the program stored in memory 202, via floppy disk controller 206. The signal inputted from keyboard 500 is inputted to CPU 204 via keyboard-interface 212.

Thereafter, CPU 204 operates in accordance with the image editing routine memory in memory 202. Then, the operated result of CPU 204 is transferred to CRT 100 via CRT controller 210 for indicating the result on CRT display screen 102. The signal inputted from keyboard 500 is sequentially stored in RAM 203, while image information is indicated on CRT 100 via VRAM 214.

c. Use modes and resources

The apparatus according to the invention includes a plurality of task modes, which are:

A. Typewriter mode based on ROM;
B. DOS mode (personal computer mode); and
C. WP mode (word processor mode).

The number of minimum necessary resources varies depending on a task mode. The description of each task mode and the resources required therefor will be made hereinafter.

A. Typewriter mode

When the main power switch is turned on without inserting disks into floppy disk drives 301 and 302, or when the menu is selected under the WP mode, the apparatus goes into the typewriter mode.

In the typewriter mode, the apparatus functions as an ordinary electric typewriter. The keyed characters are instantly printed by the printer provided in the apparatus, and correspondingly with the printing, characters are echoed back to the display screen. In order to enable the operation of the the apparatus under this mode without using any auxiliary memory means, such as a disk, the ROM in memory 202 stores the program for this mode. Since the input data through the keys corresponding to an amount that can be display on the screen are stored in RAM in memory 202, the characters may be corrected within that range.

The resources required for the typewriter mode are as follows:

(i) CPU 204, and ROM and RAM (bank 1) in memory 202
(ii) keyboard 500 and its interface 212
(iii) printer 400 and its interface 208

B. DOS mode

A DOS mode operation can be initiated by inserting system disks of a known type, such as a disk operating system (MS-DOS is used in the apparatus), into floppy disk drives 301 and 302.

The apparatus functions as a personal computer in this mode. Therefore, various application softwares which are operable under the disk operating system of the apparatus may be adapted. The programs are stored ROM and RAM in memory 202. Keyboard 500, CRT 100, and floppy disk drives 301 and 302 serve as an input unit, an output unit, and auxiliary memory units, respectively.

The resources required for the DOS mode are as follows:

(i) CPU 204, ROM and RAM (bank 1) in memory 202;
(ii) keyboard 500 and its interface 212;
(iii) floppy disk controller 206 and floppy disk drives 301 and 302 (at least one unit); and
(iv) CRT 100 and CRT controller 210

C. WP mode

A WP mode operation can be initiated by inserting a system disk of the word processor into floppy disk drive 301.

In this mode, characters keyed or read out from the disk are stored in RAM (both bank 1 and 2 are used because a certain amount of capacity is necessary), and thereafter, various kinds of editing are possible. The method for using each resource in this mode is the same as that of DOS mode, but for printing a document, a printer is necessary.

The resources required for the WP mode are as follows:

(i) CPU 204 and ROM and RAM (bank 1 and 2) in memory 202;
(ii) floppy disk controller 206 and floppy disk drives 301 and 302 (at least one unit);
(iii) CRT 100 and CRT controller 210; and
(iv) printer 400 and its interface 208.

The input/output resources used in this apparatus are as follows:

Input
(i) keyboard 500
(ii) communication port 216

Output
(i) CRT 100
(ii) communication port 216
(iii) printer 400
(iv) speaker 222
(v) disks 301 and 302

The communication port 216 (abbreviated as port hereinafter) is used as an input (or output) interface by connecting an easy connect-type terminal to the apparatus port. Since the terminal is provided with keyboard 500 and CRT 100 (or a replacement), a diagnostic program may be operated with very little error occurring.

When printer 400 is used as an output means, the input data, which are being displayed on CRT 100, are printed, in a manner similar to teletype.

Alarmed speaker 222 may produce intermittent sounds for a number of times corresponding to the fault number, thereby informing the user of the fault number.

If the DMA controller of memory 202 is not operating normally, a disk access routine may be replaced with a routine which uses a software transfer, thereby to permit an access to the disk.

d. Resource control

Even if a fault is detected in a resource when the apparatus is initially powered on, the apparatus is operated forcibly by replacing the faulty resource with some other resource.

Figure 4:
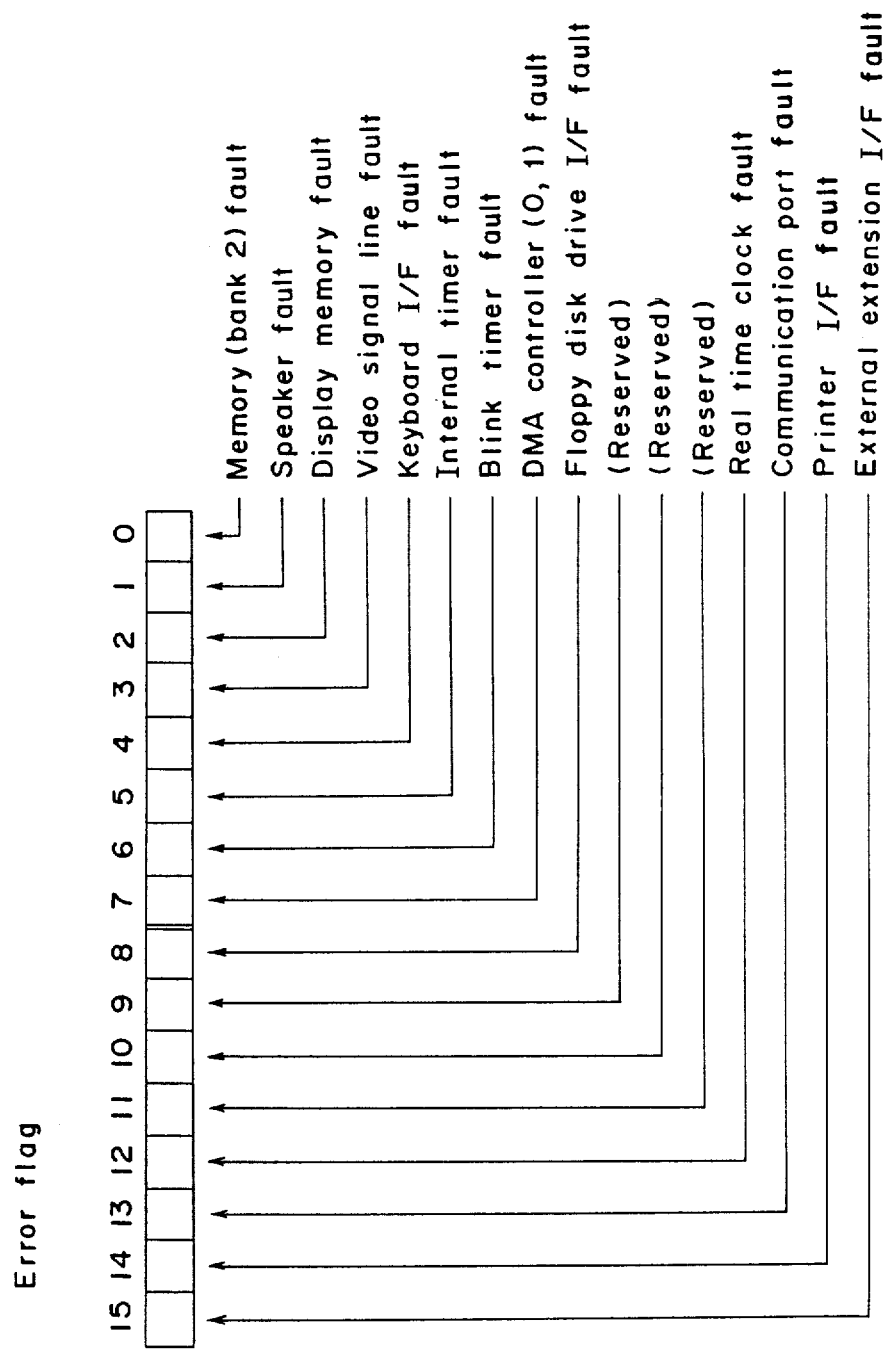
FIG. 4 is a view of fault flags.

After the turn on of a main power switch, it is checked whether or not each resource is normal, by the self-diagnostic program (see the next section e), and the diagnosed result is written in an error flag (see FIG. 4). If the error is detected in any one of CPU 204, ROM and RAM (bank 1) in memory 202, and interruption controller, the system stops because no replaceable resource is available. If resources other than the resources described above are detected as being faulty, replaceable resources are available. In this case, an operation of the system is carried out by restricting the operation relating to the faulty resource.

Figure 5:
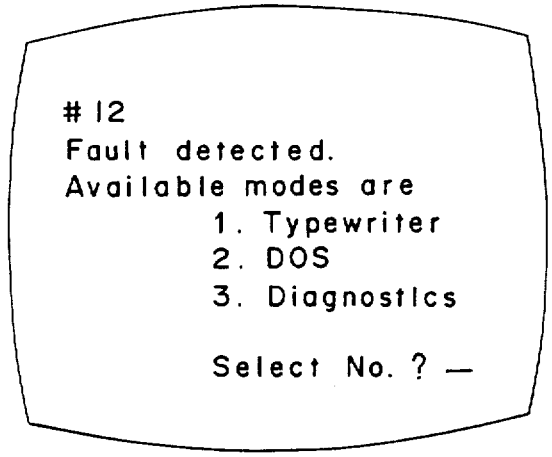
FIG. 5 is a view of a CRT screen.

After the check of each resouce, an operation of a program (see section f) for detecting the result of the self-diagnostic test begins. In this case, available task modes are selected according to the contents of the fault flag, and the selected available modes are indicated on CRT screen 102, such as shown in FIG. 5. A user selects task modes from those shown on the screen. Then, the following operations are performed. (In FIG. 5, when "Diagnostics" is selected, the contents of faults are displayed.)

A control program is provided with a fault processing routine (content of the routine varies depending on a resource) to be replaced with a drive routine of a faulty resource or with a routine that instructs nothing. Also, when an error is detected, a switching routine, provided in the control program, switches the pointer of the program to a desired one of the above routines. Therefore, when a resource, which is detected to be faulty, is needed during the system operation, the program follows the substitute routine so that the replaced resource is used.

e. Self-diagnostic test flow

When the power is supplied to the apparatus, an operation of the self-diagnostic test program (shown in FIG. 1) begins so as to check each resource. The basic feature of this self-diagnostic test is to detect new resources by using available resources. Therefore, if a resource, which has a fault that prevents any further checking, is detected, the system cannot be used any further, thus an operation of the apparatus stops. If a resource, which as a fault that will not prevent the further checking, is detected, the apparatus continues its operation such that a bit corresponding to the fault is set in a fault flag in the system shown in FIG. 4. At this time, detailed information indicating that the fault is set at an area is separately provided. This information is utilized by a separate diagnostic program which will make a detailed report about the fault later.

Figure 1B:
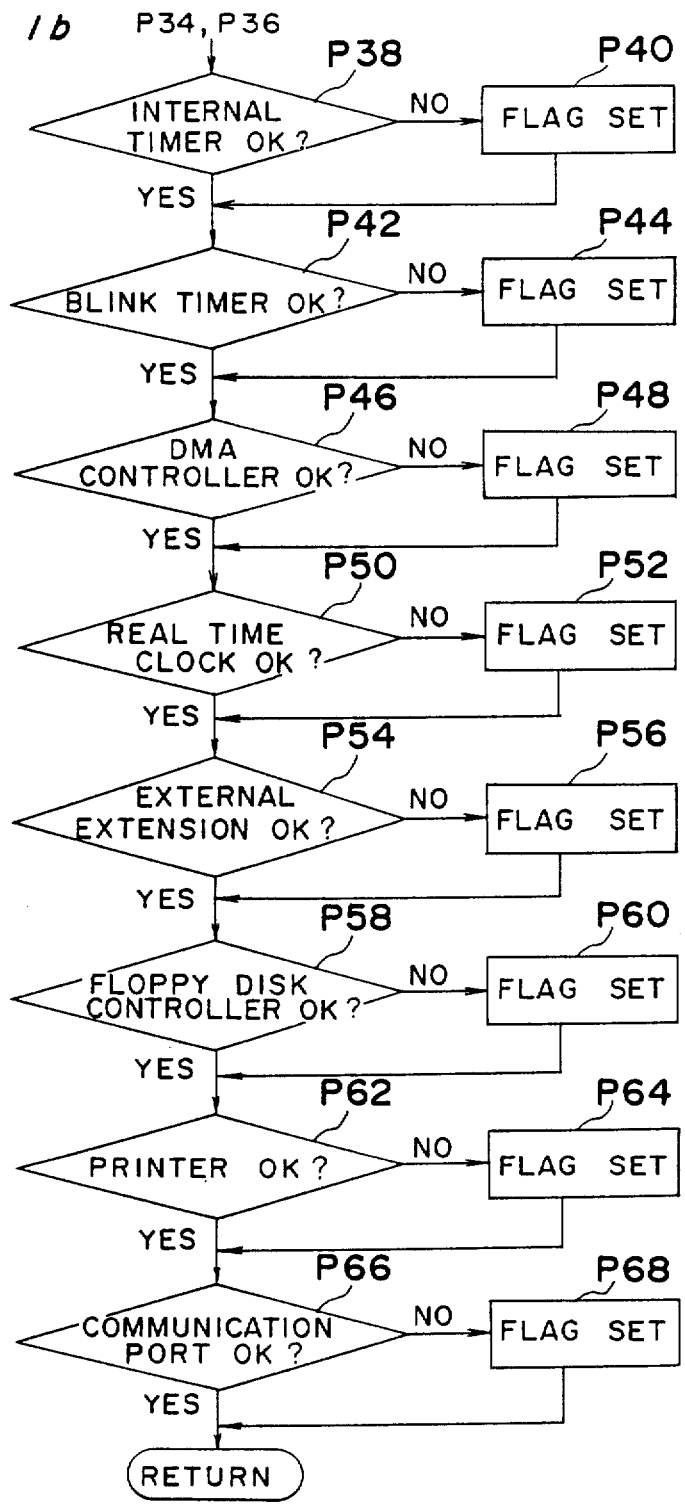

Referring to FIGS. 1a and 1b, the flow chart of the self-diagnostic test program is shown. When the power is supplied to the apparatus, the self-diagnostic test is carried out in the following steps:

Judges whether or not CPU 204 is normal (step P2). If it is detected as abnormal, the system operation stops (step P4).

Judges whether or not ROM in memory 202 is normal (step P6). If it is abnormal, the system stops (step P8).

Judges whether or not RAM (bank 1) in memory 202 is normal (step P10). If it is abnormal, the diagnosis stops (step P12).

Judges whether or not RAM (bank 2) in memory 202 is normal (step P14). If it is abnormal, 0th bit of the error flag is set (step P16).

Judges whether or not an interruption controller (not shown) is normal (step P18). If it is abnormal, the system stops (step P20).

Judges whether or not speaker 222 is normal (step P22). If it is abnormal, 1st bit of the fault flag is set.

Judges whether or not display memory (VRAM) 214 is normal (step P26). If it is abnormal, 2d bit of the fault flag is set (step P28).

Judges whether or not the video signal line of CRT controller 212 is normal (step P30). If it is abnormal, 3d bit of the fault flag is set (step P32).

Judges whether or not keyboard I/F 210 is normal (step P34). If it is abnormal, 4th bit of the fault flag is set (step P36).

Judges whether or not an internal timer (not shown) is normal (step P38). If it is abnormal, 5th bit of the fault flag is set (step P40).

Judges whether or not a blink timer (not shown) is normal (step P42). If it is abnormal, 6th bit of the fault flag is set (step P44).

Judges whether or not DMA controller is normal (step P46). If it is abnormal, 7th bit of the fault flag is set (step P48).

Judges whether or not real time clock (RTC) 218 is normal (step P50). If it is abnormal, 12th bit of the fault flag is set (step P52).

Judges whether or not an external extension I/F is normal (step P54). It it is abnormal, 15th bit of the fault flag is set (step P56).

Judges whether or not floppy disk controller 206 is normal (step P58). If it is abnormal, 8th bit of the fault flag is set (step P60).

Judges whether or not printer I/F 208 is normal (step P62). If it is abnormal, 14th bit of the fault flag is set (step P64).

Judges whether or not communication port I/F 216 is normal (step P66). If it is abnormal, 13th bit of the fault flag is set (step P68).

The above is the order by which a self-diagnostic test is carried out for diagnosing routines.

f. Decision program

The self-diagnostic decision program checks whether or not faults have occurred in each resource of the three task modes described above. In practice, a mask pattern, defined by a number of bits corresponding to the number of bits in the fault flag, is prepared for each task mode. In the mask pattern, the bits corresponding to the necessary resources are provided with binary "1's", and the bits corresponding to the resources that can be replaced are provided with binary "0's". In the self-diagnostic program, it is decided whether or not the task modes are available by taking an AND (a logic product)

between the fault flag described above and the mask pattern.

TABLE 1

| | Decision | |
|---|---|---|
| a. | mode decision | |
| | 0000000100000000 | fault flag (FDD I/F error) |
| | X | |
| | 0100000000010000 | mask pattern (typewriter mode) |
| | ↓ | |
| | 0000000000000000 | typewriter OK (all bits 0) |
| b. | decision of whether or not a task mode is available | |
| | 0110000000001110 | mask pattern (for faults with the task mode being unavailable) |
| | 0110000000001110 | decision pattern |

TABLE 2

| Fault Code List | |
|---|---|
| Fault codes | Fault contents |
| #10 | Internal timer fault |
| #11 | DMA controller (0, 1) fault |
| #12 | Memory fault (bank 2) |
| #13 | Real time clock fault |
| #14 | Communication port fault |
| #20 | Speaker fault |
| #21 | Blink fault |
| #22 | Display memory fault |
| #23 | Video signal line fault |
| #40 | Keyboard I/F fault |
| #50 | Floppy disk drive I/F fault |
| #60 | Printer I/F fault |
| #70 | (Reserved) |

Taking the typewriter mode as an example, the mask pattern is 4010H (the necessary resources are the keyboard of the 4th bit and the printer of the 14th bit.)

If a fault is detected in floppy disk controller 206, the fault flag value thereof is 0100H. Thus, the AND taken between the fault flag value and pattern mask value for the typewriter mode will result in zero.

In this case, the typewriter mode is judged as available (see a. in Table 1). As for the mode detection, there will be no problem if the AND taken between the fault flag and the mask is zero.

When a detection of mode availability is over, a fault flag number (Table 2) corresponding to a detected fault flag and the available task mode are indicated to a user (FIG. 5) and the program waits for the next key input. As apparent from Table 2, in the case shown in FIG. 5, a fault has occurred in the memory (bank 2). A user selects a task mode which he desires to be performed from the available task modes. Thereafter the operation is carried out sequentially. A fault representing the unavailable resource is judged by taking an AND between the fault flag and the mask pattern, and the result is checked whether or not the product corresponds to the decision pattern.

When a fault has occurred in a flag, access to an unavailable task mode is automatically inhibited. Therefore, the system will not start even if the unavailable task mode is selected. Access to each routine is performed through the pointer addressing the place where the routine is located. "Access to an unavailable task mode" means "access to an unavailable routine". The inhibition of the access is performed, for example, by resetting the above described pointer to address a routine which instructs nothing.

For example, when a fault is detected in the keyboard, the input is automatically switched to the communication port. If any of the input resources is unavailable, the diagnostic program can run automatically, not in an interactive form, but in a specific algorithmic form.

The same can be said to the input; for example, when CRT is unavailable, namely, when 3d or 4th bit is "one", the communication port or the printer provided in the apparatus replaces the CRT. If all of the output resources are unavailable, no means for giving information to the user is available. As a result, the system stops because of these errors. A mask pattern for deciding such a fault is prepared separately and is checked when the task modes are decided whether or not they are available.

As apparent from the above description, in the apparatus according to the invention, even if a fault is detected, the system can be operated by selecting available task modes. Therefore, even if a fault, which has made the prior art word processor systems unworkable, occurs, users can continue the operation under the restricted task modes. Further, the apparatus provides a means for inhibiting access to unavailable task modes. Consequently, problems such as erroneous operations can be prevented.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. In a document processing apparatus having:
   a plurality of kinds of input resources for inputting data;
   data processing means for processing data input through said input resources to correct, edit and/or to store the processed data in a storing means;
   a plurality of kinds of output resources which are operable for outputting data by way of a display, a printer or a sound generation, in accordance with the processed data by said data processing means; and
   control means for controlling said plurality of kinds of input and output resources and said data processing means to have a predetermined relationship to each other to enable a plurality of predetermined task modes;
   the improvement which comprises:
   diagnostic means for testing and determining whether or not each of said plurality of kinds of input and output resources is available;
   detecting means for detecting, when said diagnostic means determines that one of said plurality of kinds of input and output resources is unavailable, whether or not any one of said plurality of kinds of input and output resources can substantially respond in an acceptable mode for said one resource which is unavailable; and
   said control means, when said detecting means detects that the substitute source may respond in place of the unavailable resource, for selectively setting the task mode with the use of said substitute source to permit the document processing operation.

2. A document processing apparatus as claimed in claim 1, wherein said diagnostic means and said detecting means are operable immediately after power is applied to the document processing apparatus.

3. A document processing apparatus as claimed in claim 1, wherein said plurality of kinds of output resources comprises: at least, display means for displaying input data input by said input resources or processed data produced from said data processing means and a printing means for printing input data input by said input resources or processed data produced from said data processing means, whereby when said diagnostic means determines at least one unavailable resource, while at the same time, either one of said display means or said printing means is availble, the possible task modes are displayed or printed using the available resources.

4. A document processing apparatus as claimed in claim 1, wherein said diagnostic means comprises a plurality of bits of flags corresponding to the resources to be checked to disclose whether they are available or not, each bit flag being set when the corresponding resource is determined as unavailable, wherein said detecting means comprises a mask pattern for each test mode, said mask pattern defined by a plurality of bits of flags which are provided to represent said resources to be checked in the same manner as said plurality of bits of flags provided in said diagnostic means, each bit of flag in said mask pattern being set when the corresponding resource is necessary in the corresponding task mode, and wherein said control means comprises an AND gate means which takes a logic AND between each bit in said plurality of bits of flags in said mask pattern with a corresponding bit in said plurality of bits of flags in said diagnostic means, and said control means determines that the task mode is available when all of the results of the logic AND are zero.

5. A document processing apparatus as claimed in claim 1, wherein said diagnostic means, said detecting means and said control means are defined by a firmware including an internally provided control CPU and an internally provided memory device of said document processing apparatus, wherein said diagnostic means determines whether or not said CPU and said memory device are oprating normally, and when it is detected that either said CPU or said memory device is operating abnormally said document processing apparatus is stopped without detecting whether a substitute is available or not.

* * * * *